(12) United States Patent
Peterson et al.

(10) Patent No.: US 6,792,524 B1
(45) Date of Patent: Sep. 14, 2004

(54) SYSTEM AND METHOD CANCELLING A SPECULATIVE BRANCH

(75) Inventors: Milford John Peterson, Austin, TX (US); David Andrew Schroter, Round Rock, TX (US); Albert James Van Norstrand, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,653

(22) Filed: Aug. 20, 1998

(51) Int. Cl.[7] .................................................. G06F 9/44
(52) U.S. Cl. ........................ 712/235; 712/234; 712/240
(58) Field of Search ................................. 712/231–240

(56) References Cited

U.S. PATENT DOCUMENTS

| | | | | |
|---|---|---|---|---|
| 5,828,874 A | * | 10/1998 | Steely, Jr. et al. | 712/240 |
| 5,857,098 A | * | 1/1999 | Talcott et al. | 395/587 |
| 5,864,697 A | * | 1/1999 | Shiell | 712/240 |
| 5,909,573 A | * | 6/1999 | Sheaffer | 712/240 |
| 6,029,228 A | * | 2/2000 | Cai et al. | 711/137 |
| 6,170,053 B1 | * | 1/2001 | Anderson | 712/240 |

* cited by examiner

Primary Examiner—Stacy A. Whitmore
(74) Attorney, Agent, or Firm—Kelly K. Kordzik; Winstead Sechrest & Minick P.C.; Robert M. Carwell

(57) ABSTRACT

For each predicted branch within a processor, an entry is maintained within a branch history table. The entry within the branch history table also includes an indication of the past record for that particular branch instruction, which indicates how correct the branch prediction has been in the past. When the field value associated with the predicted branch exceeds a certain threshold, indicating that the past predictions associated with that branch instruction have been at an unacceptable level, then the speculative branch instructions dispatching is suspended for that particular branch instruction. Alternative embodiments utilize a global indicator for suspending or cancelling instruction dispatch when the frequency of previous incorrect branch predictions increases beyond a preselected threshold.

4 Claims, 8 Drawing Sheets

SYSTEM AND METHOD CANCELLING A SPECULATIVE BRANCH

TECHNICAL FIELD

The present invention relates in general to data processing systems, and in particular, to the speculative execution of instructions within a processor.

BACKGROUND INFORMATION

In modern microprocessors, there are mechanisms for speculatively executing instructions. When a branch instruction is executed, and the condition required to determine which path is taken from the branch is not available, the path is predicted, and instructions along the predicted path are then speculatively executed.

Speculative execution can improve performance significantly if the speculation is correct. In speculatively executing branch instructions, prediction algorithms can improve the accuracy of the guess of which path to take from a branch instruction. However, if the prediction is wrong, then some type of recovery mechanism must be utilized to cancel the effect of instructions that should not be completed.

In actual practice, it is sometimes difficult and expensive to selectively cancel instructions as a result of a bad branch speculation. Therefore, there is a need in the art for an improved technique for speculative branching within a processor.

SUMMARY OF THE INVENTION

The present invention addresses the foregoing need by providing a system and method for cancelling speculative dispatching of instructions under certain circumstances. In a first embodiment of the present invention, a branch history table is modified to include a bit field associated with each entry (branch instruction) within the table, which indicates the past performance of the associated branch prediction within the branch history table. Each time the particular branch instruction is predicted within the processor, the accuracy of that prediction is then taken into account in modifying this bit field.

In an embodiment of the present invention, the bit field is a counter field, which increments each time the prediction is incorrect, and decrements each time the prediction is correct. Whenever the number within the counter field exceeds a threshold value, the instruction dispatch associated with the predicted branch is cancelled.

In a second embodiment of the present invention, a single counter is maintained and incremented each time a branch prediction is incorrect, and decremented each time the prediction is correct. Whenever the number within the counter field exceeds a threshold value, instruction dispatches are cancelled, or suspended, until the counter field no longer exceeds the threshold value.

In a third embodiment of the present invention, a 2-bit state field is maintained and stored in the branch history table with each entry in the table. One of the states indicates that the particular branch instruction has been previously strongly predicted as taken. A second state indicates that the branch instruction has previously weakly been predicted as taken. A third state indicates that its associated branch instruction has previously been weakly predicted as not taken. And a fourth state associated with a branch instruction entry in the branch history table indicates that it has been previously strongly predicted as not taken. For each branch prediction, a determination is made whether the state associated with the particular branch instruction has been previously strongly or weakly predicted as taken or not taken. If it has been previously strongly predicted as taken or not taken, then instruction dispatch along the chosen instruction path is allowed to continue. However, if the particular branch instruction has been previously weakly predicted as taken or not taken, then instruction dispatch is suspended, or cancelled.

In a fourth embodiment of the present invention, if a predetermined number of weakly predicted taken or not taken states are encountered in succession, then instruction dispatch for all of the entries in the branch history table is suspended until a "strong" state is encountered.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
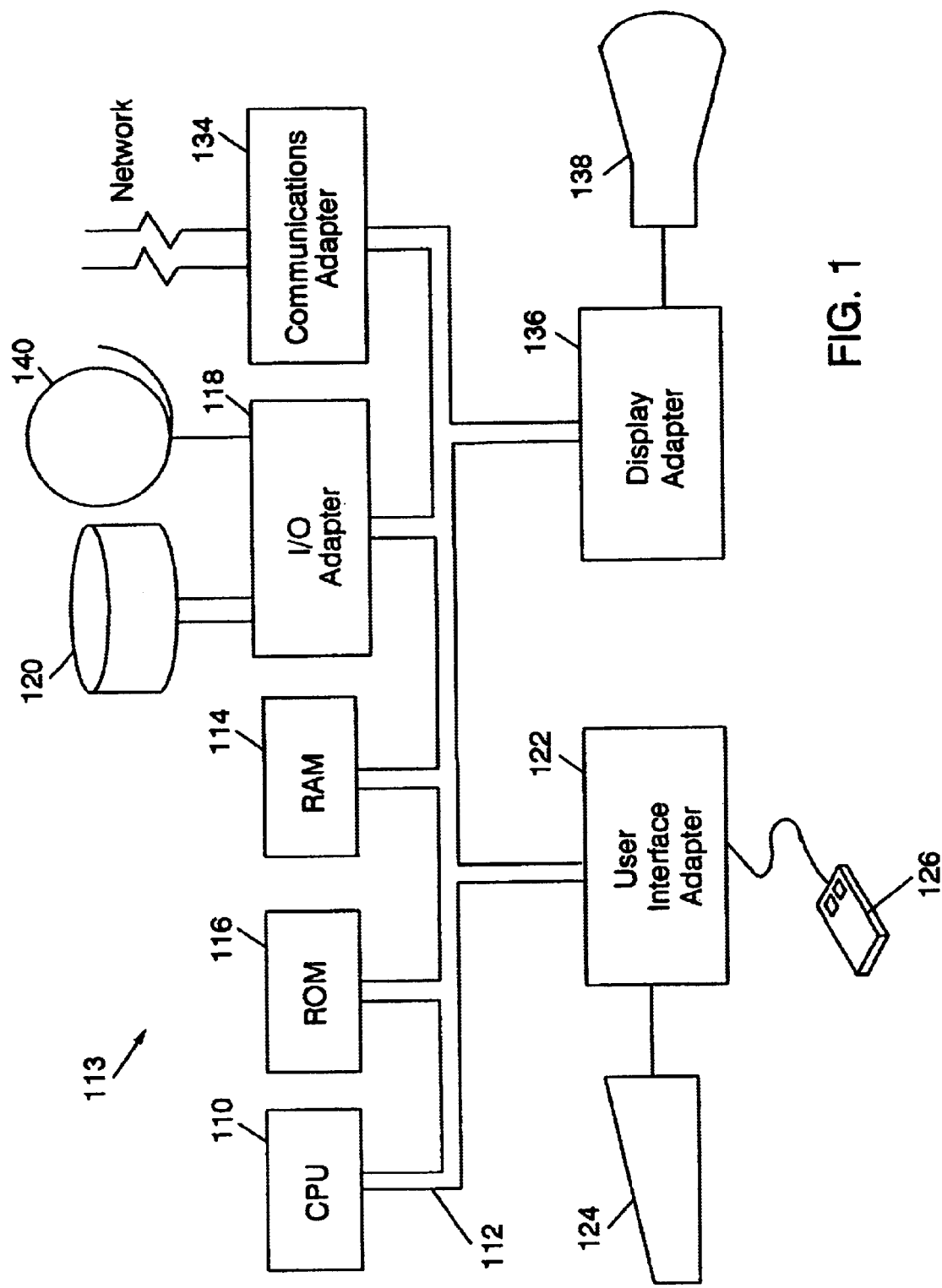
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, such as a conventional microprocessor, and a number of other units interconnected via system bus 112. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may reside on a single integrated circuit.

Figure 2:
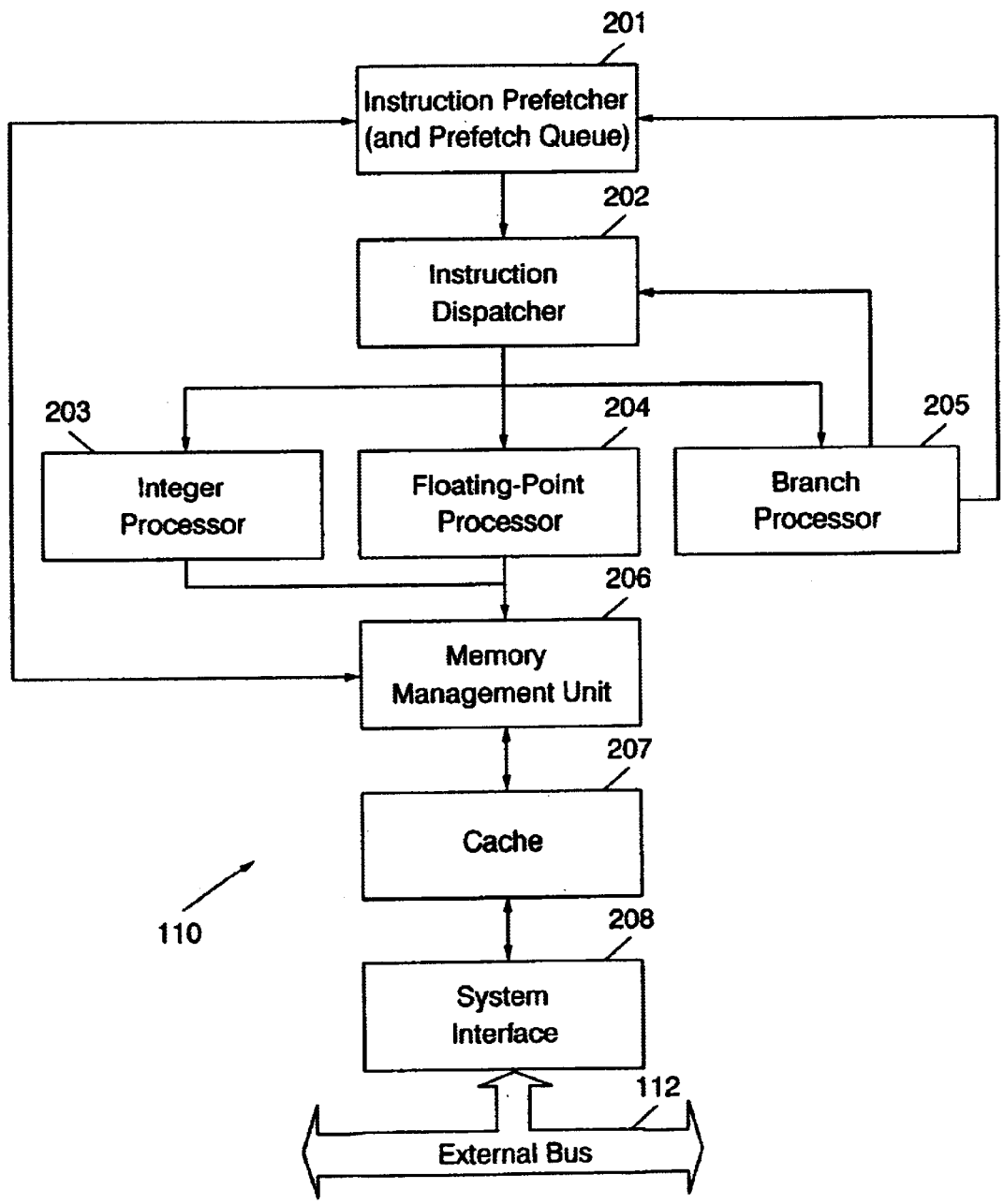
FIG. 2 illustrates a processor configured in accordance with the present invention.

FIG. 2 illustrates a portion of the basic hardware elements within processor 110. Though only one integer and floating-point processor is shown, it should be noted that a processor may incorporate more than one integer and/or floating-point units. Furthermore, there are other equivalent processor architectures that could benefit from the branch processing techniques of the present invention.

In the processor 110, each instruction is one word long. The instruction unit is part of the processor core. It implements an instruction prefetcher 201 that fetches instruction words from memory. Unless the branch unit 205 specifically commands the prefetcher 201 to alter its normal fetch path, the prefetcher 201 fetches instruction words from sequential words in memory. It does this by sending the next sequential word-aligned memory address to the memory management unit (MMU) 206.

The instruction dispatcher 202 extracts instruction words from the prefetch queue 201 and forwards them to the correct processing unit for decode and execution. Dispatcher 202 may be capable of only dispatching one instruction at a time and be constrained to wait for the completion of the instruction before dispatching the next instruction in line. On the other hand, dispatcher 202 may possess the ability to dispatch multiple instructions simultaneously (in other words, a superscalar implementation).

Instructions in the processor's instruction set may be executed by the integer unit 203, which will often employ its own internal instruction pipeline, permitting it to accept the next integer-oriented instruction before it completes execution of the previous one that it had accepted. Processor 110 may implement more than one integer unit.

The processor's floating-point processor 204 executes all floating-point instructions. Processor 204 will usually employ its own instruction pipeline, permitting it to accept the next floating-point-oriented instruction before it completes execution of the previous one it accepted. Processor 110 may implement more than one floating-point unit.

The branch processor 205 executes all branch instructions. When a conditional branch instruction is received, it is evaluated to determine if the condition specified for the branch has been met. If it has, the branch execution unit 205 instructs the instruction prefetcher 201 to alter its program flow so as to fetch the next instruction from the branch target address (rather than from the next sequential address). In addition, the instructions that follow the branch that have already been prefetched are flushed.

In a superscalar design, the branch can be extracted from the instruction stream by the branch unit 205 early and evaluated. If the hint bit or a branch prediction table (BHT) indicates that the branch will be taken, the branch unit 205 commands the instruction prefetcher 201 to alter the program flow. In the event that the prediction proves correct (when the indicated condition has been resolved by one of the other units), the instruction unit will have already fetched the instruction starting at the branch target address. If the branch is incorrectly predicted, the branch processor 205 must flush all of the new instructions from the instruction pipeline and must resume prefetching at the correct location (the one that follows the branch in memory).

If the MMU 206 has been enabled by the operating system, it examines the target memory address supplied by the integer processor 203, the floating-point processor 204 or the instruction prefetched in order to determine if the target address maps to a page that is currently present in memory.

The MMU 206 receives the address from the instruction unit 201 and attempts to translate it into the corresponding physical memory address by searching the page table. If the processor 110 implements either a code cache or a combined code/data cache and the MMU 206 considers the target area of memory to be cacheable, the physical memory address is then submitted to the cache 207 for a lookup. If the target area of memory is considered non-cacheable by the MMU 206 or results in a miss in the cache 207, the physical address is submitted directly to the system interface 208 by the MMU 206 so that it can perform the required bus transaction.

If the requested code or data is in the cache 207, the cache 207 supplies the item to the requester. If the prefetcher 201 had requested an instruction word, the prefetcher 201 places it in the prefetch queue, which, in turn, feeds instructions to the processing units to be decoded and executed. If the requested data or instruction is not currently in the cache 207 and the target area of memory is considered cacheable by the MMU 206, the physical memory address is submitted to the system interface 208 by the cache 207 with a request for the block of information that contains the requested item. The system interface 208 then performs a burst cache block-fill memory read bus transaction to fetch the requested block from external memory.

When the cache block has been read from memory, the requested item is routed directly back to the requester and the block of information is placed in the cache 207 to satisfy possible future requests.

If there is no cache or if the target area of memory is considered non-cacheable by the MMU 206, the physical memory address is submitted directly to the system interface 208. The system interface 208 then performs a memory read bus transaction to fetch the requested data or instruction from external memory.

It is an object of the present invention to provide a system and method for starting and stopping speculative execution as a function of branch prediction. Instruction dispatch down a speculative branch path is suspended or cancelled during a period wherein the history shows a poor track record for a branch instruction(s). The suspension is lifted when the accuracy of the prediction for the branch instruction(s) has increased.

Figure 3:
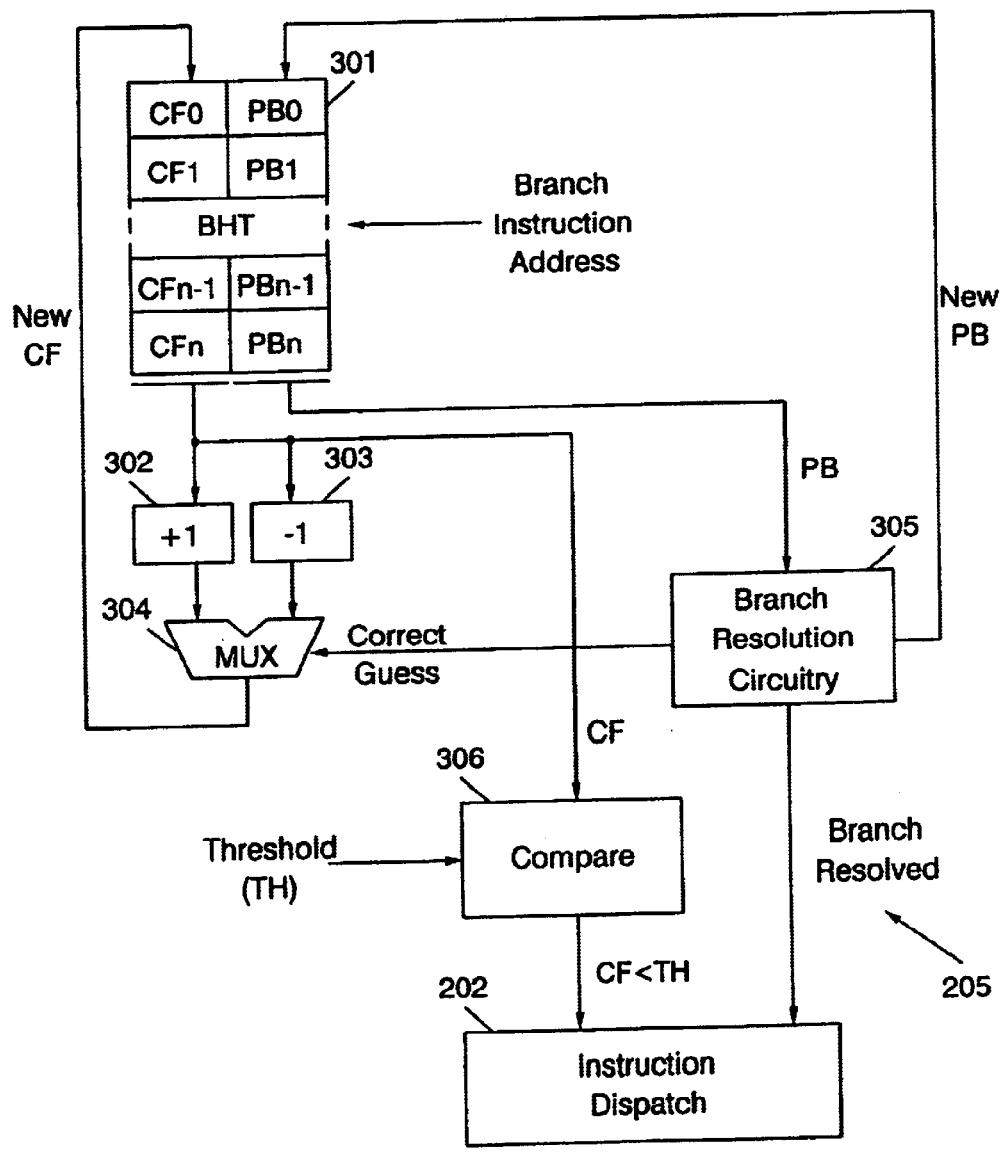
FIG. 3 implements a block diagram of an embodiment of the present invention.

Referring to FIG. 3, branch prediction employs a branch history table (BHT) 301 that records part of a branch instruction's address in a table entry along with some indicator that assists the speculation (i.e., taken/not-taken, target address, target instruction, etc.). When a branch instruction is executed within the branch processor 205, the address of the branch instruction is used to interrogate the BHT 301 to determine the path to be dispatched. This path is speculative until the branch instruction is resolved. If the branch is guessed incorrectly, performance is affected since the guessed instructions down the mispredicted path must be purged from the instruction pipeline within processor 110. Furthermore, the correct path of instructions has now been correspondingly delayed.

In one embodiment, a counter field (CF) is associated with each BHT entry. The counter field is a record of how frequently the entry (branch instruction) predicted a correct branch. If the frequency falls below a threshold value (TH), speculative execution of predicted paths is suspended or cancelled.

For example, a CF of 3 bits would be initialized to 0 when the entry is first created within the BHT 301. Each time the speculative branch instruction is guessed incorrectly, the CF is incremented. Each time the entry results in a correct prediction, the CF is decremented. This may be accomplished by a correct_guess signal from branch resolution circuitry 305 operating to select one of two entries in multiplexer 304. A first entry is from incrementor 302, while a second entry is from decrementor 303. Incrementor 302 and decrementor 303 both receive the CF entry associated with the particular predicted branch.

The branch resolution circuitry 305 will determine whether or not the predicted branch was correctly guessed once the condition indicated within the branch instruction is available. The results of this branch resolution will also be returned to the branch history table 301 to be accompanied by its updated CF (New CF) value.

When a branch prediction is provided by the branch history table 301, its associated CF value is also provided to comparator 306, which compares the value to a predetermined threshold (TH). When the CF value exceeds the threshold, speculative instruction execution will be suspended or cancelled within instruction dispatch unit 202. Once the CF value for that particular branch instruction has decreased below the threshold value, then suspension or cancellation of speculative execution associated with that branch instruction will be released.

Figure 4:
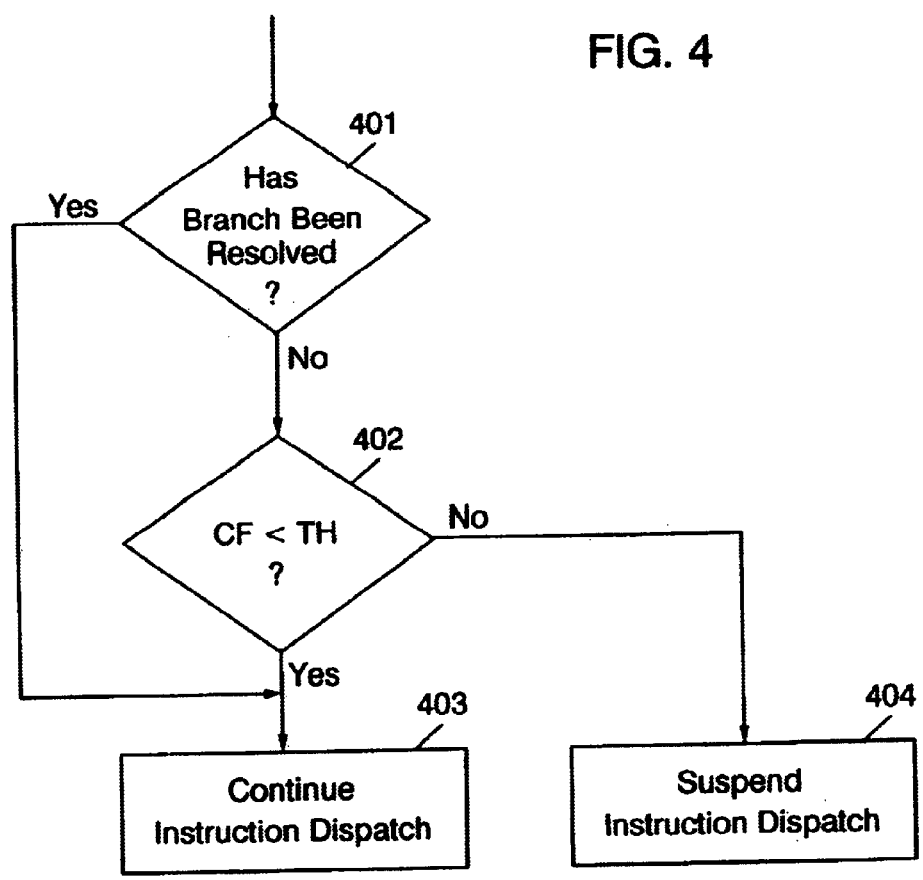
FIG. 4 illustrates a flow diagram implemented in accordance with the present invention.

Referring next to FIG. 4, there is illustrated a flow diagram for implementing associated logic circuitry within instruction dispatch unit 202. In step 401, a determination is made whether or not the branch instruction has been resolved as indicated by a signal received from branch resolution circuitry 305. If yes, the process proceeds to step 403 to continue with instruction dispatch down the resolved path. If the branch has not been resolved, then the process proceeds to step 402 to determine if the CF value for the branch instruction is less than the predetermined threshold value (TH). If yes, instruction dispatch is continued in step 403 down the predicted path. If, however, CF is greater than TH, then the process proceeds to step 404 where instruction dispatch and execution is suspended, or cancelled, down the predicted path.

The present invention may also be modified to suspend or cancel the prefetching of instructions by the instruction prefetcher 201 down the predicted path instead of or in combination with step 404.

Figure 5:
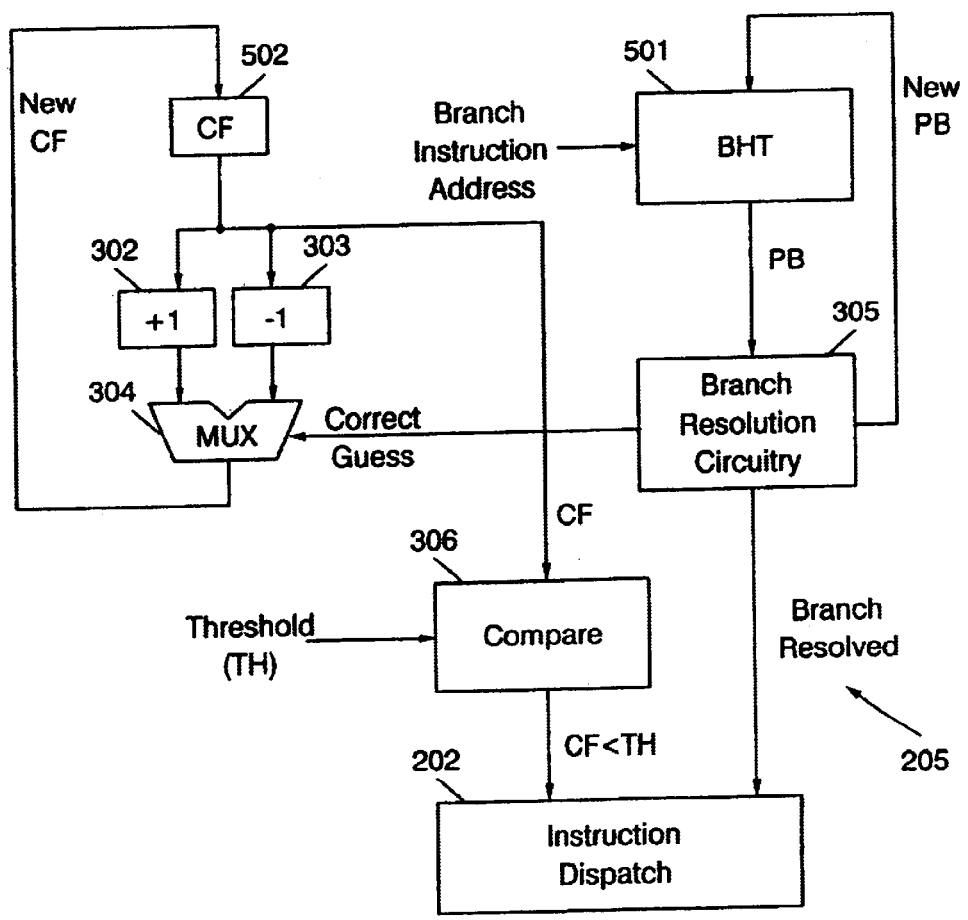
FIG. 5 illustrates an alternative embodiment of the present invention.

Referring next to FIG. 5, there is illustrated an alternative embodiment of the present invention whereby a global counter field (CF) is maintained for the entire BHT 501. The BHT 501 operates similarly as BHT 301, and the branch resolution circuitry 305 operates similarly as the branch resolution circuitry 305 described above with respect to FIG. 3. The difference is that there is a single counter field 502 as opposed to a counter field associated with each of the entries in the BHT 301. Again, incrementor 302 and decrementor 303 are utilized along with mux 304 to increment or decrement the counter field 502 value. With each branch prediction, the counter field 502 value is compared by comparator 306 with a predetermined threshold (TH) value. The remainder of the process implemented within instruction dispatch unit 202 is as described above with respect to FIG. 4. If the counter field 502 value is less than the threshold value, then instruction dispatch is allowed to continue in step 403. Otherwise, instruction dispatch is suspended or cancelled in step 404. Suspension or cancellation of instruction dispatch due to a branch prediction by BHT 501 is not resumed until after the counter field value is greater than (or equal to) the threshold value, which will result when the frequency of correct branch predictions increases.

Figure 6:
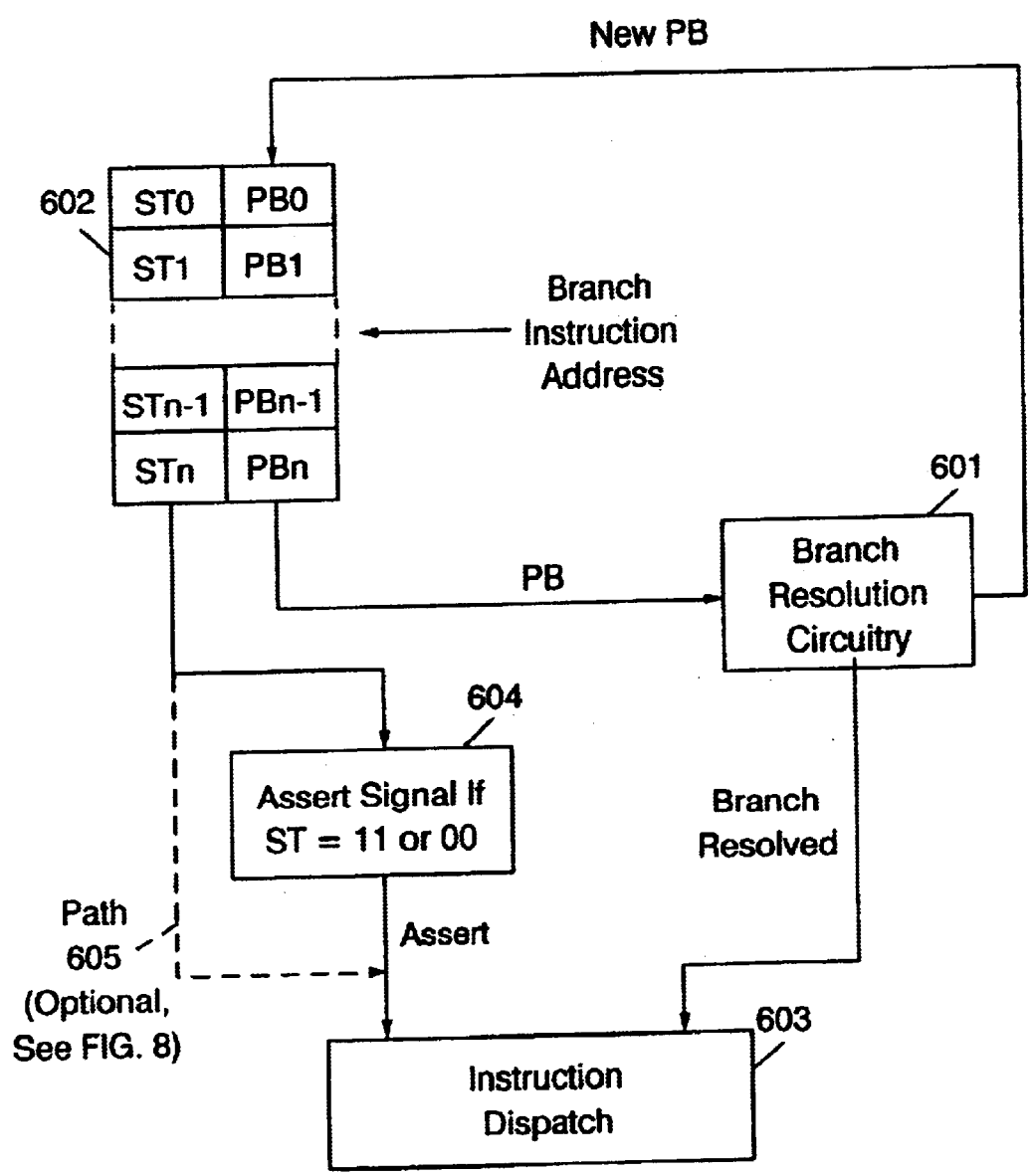
FIG. 6 illustrates another alternative embodiment of the present invention.
Figure 7:
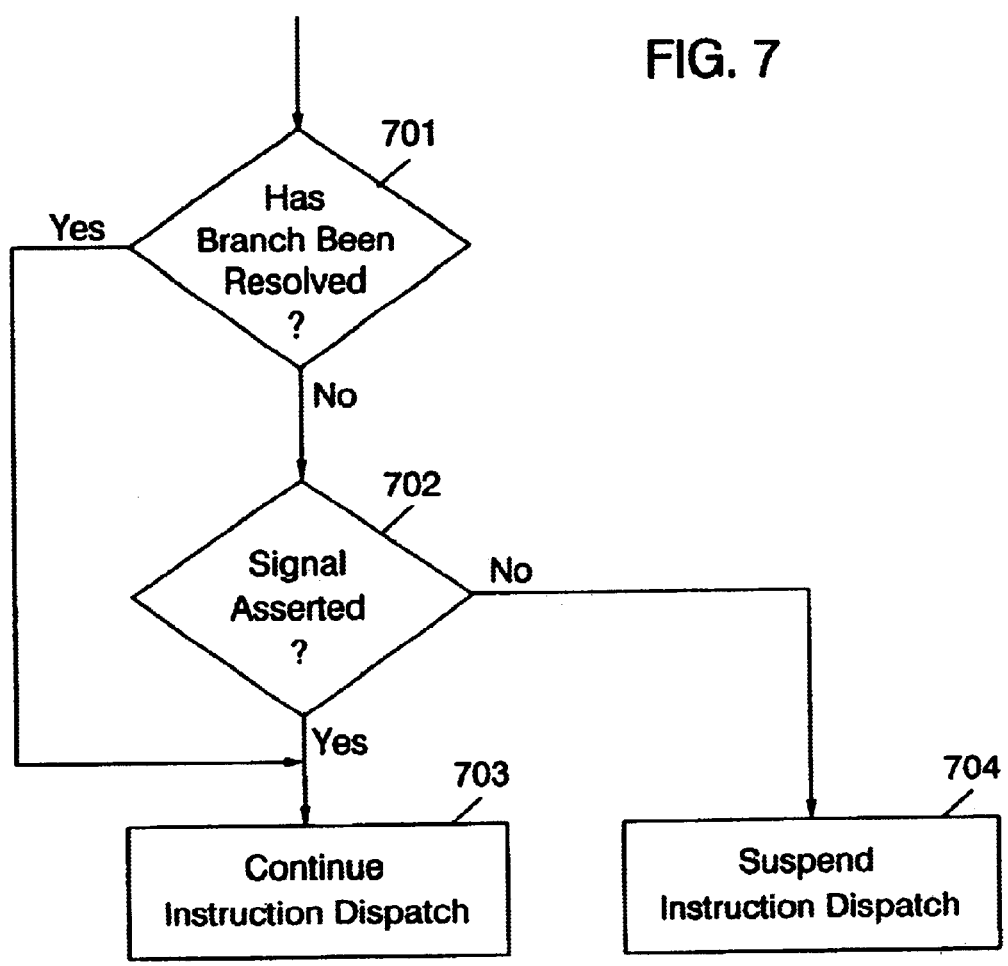
FIG. 7 illustrates a flow diagram implemented within an instruction dispatch unit in accordance with the embodiment illustrated in FIG. 6.

Referring next to FIGS. 6 and 7, there is illustrated yet another embodiment of the present invention. This embodiment of the present invention utilizes a state field for indicating strong or weak predictions. In this embodiment, associated with each entry within BHT 602, there is associated a strength (ST) n-bit value (in this example, a 2-bit value) providing an indication of whether or not branch prediction associated with each particular entry in the branch history table has recently had a history of being strongly predicted as taken or not taken or weakly predicted as taken or not taken. In the present example, the following states may be maintained.

| State | Meaning |
|-------|---------|
| 11 | strongly predicted taken |
| 10 | weakly predicted taken |
| 01 | weakly predicted not taken |
| 00 | strongly predicted not taken |

The maintenance of such states may be performed in many ways. In one embodiment, a saturating up-down counter may be used. As an example, as long as a particular branch instruction is continued to be predicted as taken, its associated state will remain 11. When the prediction for taken is determined to be erroneous, or incorrect, then the state is changed to 10. The same is performed with respect to the not taken predictions.

In one embodiment of the present invention, branch processor 601 operates in a similar fashion as branch resolution circuitry 305. With each branch prediction, a determination is made whether the state associated with the particular branch instruction has a state equal to 11 or 00, i.e., strongly predicted as taken or not taken. This is performed by block 604. If this is true, then a signal is asserted and sent to instruction dispatch unit 603.

Referring to FIG. 7, the process within instruction dispatch unit 603 is performed. If the branch instruction has been resolved in step 701, the process will proceed to step 703 to continue the instruction dispatch to the execution units. Otherwise, the process proceeds to step 702 to determine if the signal from block 604 has been asserted. If the signal has been asserted, then the process within instruction dispatch unit 603 will continue to step 703 to continue with instruction dispatch. If the signal is not asserted from block 604, then the process will proceed to step 704 to suspend or cancel the instruction dispatch along the predicted path. Thus, this embodiment of the present invention suspends or cancels instruction dispatch along a predicted path when branch prediction associated with that particular branch instruction has previously been incorrect.

In an alternative embodiment, the strength (ST) states associated with each entry in BHT 602 may only be changed to either 10 or 01 after a specified number of incorrect predictions have occurred.

Figure 8:
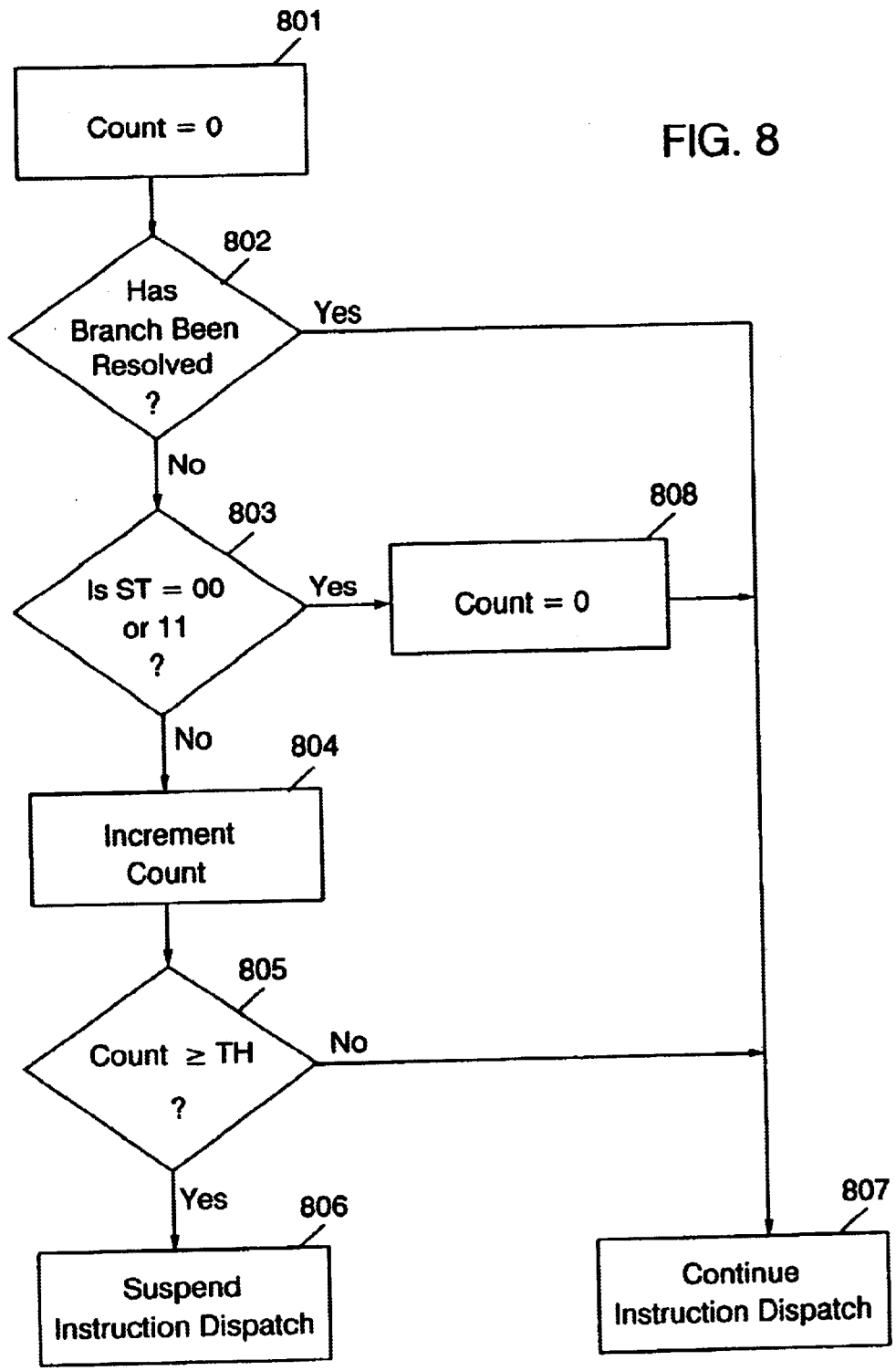
FIG. 8 illustrates another alternative embodiment of the present invention.

In another alternative embodiment of the present invention, the strength (ST) states may be used in a more global manner. In this embodiment, block 604 is bypassed with path 605. Referring to FIG. 8, in step 801, a Count value will be initialized to 0. In step 802, the process within instruction dispatch unit 603 will determine if the branch has been resolved. If yes, the process proceeds to step 807 to continue instruction dispatch. If not, the process proceeds to step 803 to determine if the strength (ST) value is either equal to 00 or 11. If not (indicating a "weak" state), then the process increments the Count value in step 804 and then compares the Count value to a predetermined threshold (TH) value in step 805. If the Count value is greater than the threshold value, then the process proceeds to step 806 to suspend or cancel instruction dispatch.

If the Count value is not greater than or equal to the threshold value, then instruction dispatch is continued in step 807.

In step 803, if the ST state is equal to either 10 or 01, then the Count value is reset to 0 in step 808 and instruction dispatch is continued in step 807.

This embodiment of the present invention looks to continue instruction dispatch along a predicted path only when previous branch predictions have had a greater frequency of being correct.

Although the present invention and its advantages have been described in detail, it should be understood that various changes, substitutions and alterations can be made herein without departing from the spirit and scope of the invention as defined by the appended claims.

What is claimed is:

1. A processor comprising:
    an instruction dispatcher operable for dispatching instructions to a plurality of execution units and a branch processor, wherein the branch processor is operable for executing a branch instruction, said branch processor further comprising:
        a branch history table entry for predicting a path to be taken from the branch instruction as a function of a past prediction for the branch instruction;
        a counter value indicating an accuracy of past predictions, wherein the counter value is associated with the branch history table entry for the branch instruction indicating the accuracy of past predictions for the branch instruction,
        circuitry for cancelling a speculative instruction dispatch, associated with the predicted path, when the counter value exceeds a threshold value;
        an incrementor for increasing the counter value each time a path is incorrectly predicted for the branch instruction;
        a decrementor for decreasing the counter value each time a path is correctly predicted for the branch instruction;
        a multiplexor for selecting between the increased value from the incrementor and the decreased value from the decrementor as a function of a resolution of the branch instruction; and
        circuitry for storing the selected value with the branch instruction in the branch history table.

2. In a processor, a method comprising the steps of:
    dispatching a branch instruction to a branch processor;
    predicting a path to be taken from the branch instruction as a function of a past prediction for the branch instruction;
    comparing a counter value to a predetermined threshold value, wherein the counter value indicates an accuracy of past predictions, wherein the counter value is associated with the branch instruction indicating the accuracy of past predictions for the branch instruction;
    cancelling a speculative instruction dispatch, associated with the predicted path, when the counter value exceeds the threshold value;
    increasing the counter value each time a path is incorrectly predicted for the branch instruction;
    decreasing the counter value each time a path is correctly predicted for the branch instruction;
    selecting between the increased value and the decreased value as a function of a resolution of the branch instruction; and
    storing the selected value with the branch instruction in the branch history table.

3. A system for suspending speculative execution of instructions within a processor comprising:
    circuitry for determining a probability that a branch instruction will result in a particular branch direction;
    circuitry for suspending speculative dispatching of instructions in association with the branch instruction when the probability is less than a predetermined value;
    circuitry for determining a ratio of strongly predicted branches to weakly predicted branches for a plurality of recently executed branch occurrences; and
    circuitry for suspending speculative dispatch for all branch instructions when the ratio is less than a predetermined value.

4. The system as recited in claim 3, wherein the determining circuitry is a branch history table.

* * * * *

UNITED STATES PATENT AND TRADEMARK OFFICE
CERTIFICATE OF CORRECTION

PATENT NO.   : 6,792,524 B1
DATED        : September 14, 2004
INVENTOR(S)  : Milford John Peterson, David Andrew Schroter and Albert James Van Norstrand It is certified that error appears in the above-identified patent and that said Letters Patent is hereby corrected as shown below:

Column 7,
Line 49, following "instruction" please replace "," with -- ; --.

Signed and Sealed this

Third Day of May, 2005

JON W. DUDAS
*Director of the United States Patent and Trademark Office*